(12) United States Patent
Verbridge et al.

(10) Patent No.: US 12,024,160 B2
(45) Date of Patent: Jul. 2, 2024

(54) SYSTEMS AND METHODS FOR PERFORMING VEHICLE YAW IN AN ELECTRIC VEHICLE

(71) Applicant: Rivian IP Holdings, LLC, Plymouth, MI (US)

(72) Inventors: Mason Verbridge, Canton, MI (US); Rahul Madineni, Farmington Hills, MI (US); Nachiket Vader, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 263 days.

(21) Appl. No.: 17/342,687

(22) Filed: Jun. 9, 2021

(65) Prior Publication Data

US 2022/0396258 A1 Dec. 15, 2022

(51) Int. Cl.
*B60W 30/02* (2012.01)
*B60K 7/00* (2006.01)
(Continued)

(52) U.S. Cl.
CPC ........... *B60W 30/02* (2013.01); *B60K 7/0007* (2013.01); *B60K 17/356* (2013.01); *B60K 23/0808* (2013.01); *B60K 35/00* (2013.01); *B60W 10/08* (2013.01); *B60W 10/119* (2013.01); *B60W 10/20* (2013.01); *B60W 30/182* (2013.01);
(Continued)

(58) Field of Classification Search
CPC .... B60W 30/02; B60W 10/08; B60W 10/119; B60W 10/20; B60W 30/182; B60W 2540/215; B60W 2520/14; B60W 2520/266; B60W 2710/083; B60W 2710/207; B60W 2720/14; B60W 2720/30; B60W 2720/406; B60K 7/0007; B60K 17/356; B60K 23/0808; B60K 35/00; B60K 2370/11; B60K 2007/0038; B60K 2023/0858; B62D 15/025
See application file for complete search history.

(56) References Cited

U.S. PATENT DOCUMENTS

| 2003/0028305 A1* | 2/2003 | Boswell | B62D 7/1581 |
| | | | 180/408 |
| 2009/0051216 A1* | 2/2009 | Maeda | B60W 30/02 |
| | | | 303/146 |

(Continued)

OTHER PUBLICATIONS

Z. Zhang et al., "A Novel Steering System for a Space-Saving 4WS4WD Electric Vehicle: Design, Modeling, and Road Tests," in IEEE Transactions on Intelligent Transportation Systems, vol. 18, No. 1, pp. 114-127, Jan. 2017, doi: 10.1109/TITS.2016.2561626. (Year: 2017).*

*Primary Examiner* — Jaime Figueroa
*Assistant Examiner* — Joshua Alexander Garza
(74) *Attorney, Agent, or Firm* — Haley Guiliano LLP

(57) ABSTRACT

Systems and methods are provided herein for operating an electric vehicle in a vehicle yaw mode. The electric vehicle includes a normal driving mode where the electric vehicle is steered by turning the steerable wheels (e.g., left or right) and vehicle yaw mode where the vehicle controls the torque applied to each wheel. In response to receiving input to initiate vehicle yaw mode and yaw direction, the system determines the inner wheels and the outer wheels and provides forward torque to the outer wheels of the vehicle and backward torque to the inner wheels of the vehicle to rotate the vehicle.

20 Claims, 8 Drawing Sheets

(51) Int. Cl.
*B60K 17/356* (2006.01)
*B60K 23/08* (2006.01)
*B60K 35/00* (2006.01)
*B60K 35/10* (2024.01)
*B60W 10/08* (2006.01)
*B60W 10/119* (2012.01)
*B60W 10/20* (2006.01)
*B60W 30/182* (2020.01)
*B62D 15/02* (2006.01)

(52) U.S. Cl.
CPC .... *B62D 15/025* (2013.01); *B60K 2007/0038* (2013.01); *B60K 2023/0858* (2013.01); *B60K 35/10* (2024.01); *B60K 2360/11* (2024.01); *B60W 2520/14* (2013.01); *B60W 2520/266* (2013.01); *B60W 2540/215* (2020.02); *B60W 2710/083* (2013.01); *B60W 2710/207* (2013.01); *B60W 2720/14* (2013.01); *B60W 2720/30* (2013.01); *B60W 2720/406* (2013.01)

(56) References Cited

U.S. PATENT DOCUMENTS

| | | | | |
|---|---|---|---|---|
| 2015/0105978 A1* | 4/2015 | Nakatsu | ................ | B60W 10/08 |
| | | | | 701/37 |
| 2021/0309114 A1* | 10/2021 | Nordmann | ............... | B60K 6/52 |
| 2021/0380165 A1* | 12/2021 | Chao | ...................... | B62D 6/002 |
| 2021/0403087 A1* | 12/2021 | Mayer | ...................... | B60R 1/00 |
| 2022/0118979 A1* | 4/2022 | Pursifull | ............ | B60G 17/0162 |

* cited by examiner

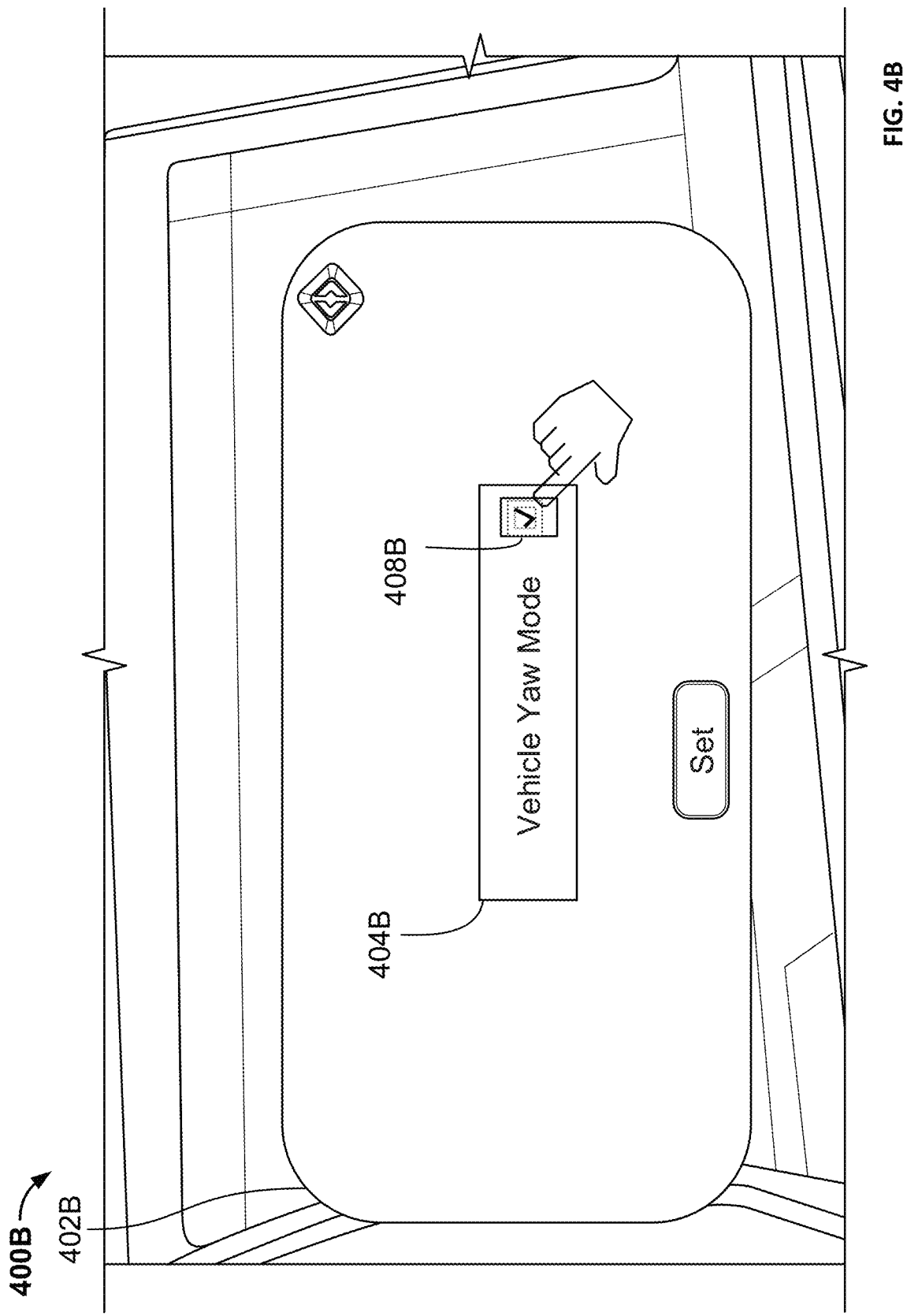

SYSTEMS AND METHODS FOR PERFORMING VEHICLE YAW IN AN ELECTRIC VEHICLE

INTRODUCTION

Modern vehicles perform turns by allowing the driver to turn the front wheels of the vehicle (e.g., by turning the steering wheel). Such turns result in large turning radii and become difficult to perform in narrow paths and dead ends, such that maneuvering the vehicle out of the narrow paths becomes difficult requiring to make multi-point turns to turn the vehicle around. Consequently, what is needed is an improved turning capability of the vehicle that enables reduced turning radii with controlled torque at each wheel.

SUMMARY

In accordance with the present disclosure, systems and methods are provided that improve the turning operation of an electric vehicle by performing vehicle yaw to allow the vehicle to pivot, for example, around a point under the chassis of the vehicle. The vehicle may include a normal driving mode where the electric vehicle is steered by turning one or more wheels left or right using, e.g., a steering wheel. The vehicle may also include a vehicle yaw mode where the electric vehicle is rotated about a point under the chassis of the vehicle and other driving modes. In some embodiments, vehicle yaw is performed after receiving an input to engage vehicle yaw mode and an indication of a yaw direction. For example, a method may utilize improved features of a vehicle (e.g., independent control of front and back driveshafts, independent control of the wheels, independent control of the brakes, etc.) to provide a vehicle with a capability of performing yaw (in either direction) around a point under the chassis of the vehicle. Vehicle yaw can be performed in various vehicles described herein capable of distributing torque and/or braking to each of one or more of the wheels of the vehicle.

In some implementations, techniques described below may be performed by processing circuitry of a vehicle. The processing circuitry may be implemented as a part of a vehicle, included in the vehicle, and/or embedded in the vehicle electronics, among other possibilities. In some embodiments, the processing circuitry may comprise an on-board vehicle computer that can control multiple features or capabilities of the vehicle. In some embodiments, the processing circuitry may be communicatively connected with user inputs of the vehicle, sensors of the vehicle, and transitory or non-transitory memory (e.g., memory-storing institutions for operating the vehicle).

In some embodiments, a method for performing vehicle yaw in an electric vehicle is provided. For example, the processing circuitry may engage the vehicle yaw mode for performing a vehicle yaw of the vehicle under certain circumstances. In some embodiments, the vehicle yaw is performed in with various other types of modes as well. In some embodiments, the processing circuitry may engage the vehicle yaw mode after the user issues a command requesting such mode (e.g., by pressing an appropriate button, turning the steering wheel to a certain point, or via any other input). In some embodiments, the electric vehicle may include a normal driving mode where the electric vehicle is steered by turning steerable wheels of the vehicle. For example, the front wheels of the vehicle may be steered by changing the wheel angle. Another example, the rear wheels may be steered by changing the wheel angle of the wheels. In yet another example, all wheels of the vehicle may be steered by changing the angle of the steerable wheels to turn the vehicle.

In some embodiments, the processing circuitry may engage the vehicle yaw mode after a number of criteria checks are performed (e.g., wheel alignment, drive mode, vehicle speed, periphery checks, geo-fencing, vehicle health, etc.). For example, the processing circuitry may determine that the vehicle is stationary (or nearly stationary) with all the wheels straight, including the steerable wheels. In some embodiments, the vehicle yaw mode may only be activated when all wheels of the vehicle are straight (e.g., aligned to be parallel to the length of the vehicle). In some embodiments, the vehicle yaw mode may be activated when front wheels of the vehicle are below a turn threshold (e.g., less than 10 degrees from being aligned to be parallel to the length of the vehicle). In some embodiments, in response to initiating the vehicle yaw mode, the vehicle may cause the wheels of the vehicle to automatically (by the vehicle without any user inputs) straighten to the center (e.g., aligned to be parallel to the length of the vehicle). In some embodiments, when the criteria checks are met, the processing circuitry may initiate the vehicle yaw mode.

In some embodiments, the processing circuitry may receive an input for a yaw direction (e.g., right yaw or left yaw) for the vehicle. The processing circuitry determines the inner wheels and the outer wheels based on the received yaw direction. For example, in response to receiving an indication of a right yaw, the processing circuitry determines that the left side wheels are the outer wheels and the right-side wheels are the inner wheels. In another example, in response to receiving an indication of a left yaw, the processing circuitry determines that the left side wheels are the inner wheels and the right-side wheels are the outer wheels.

In some embodiments, the processing circuitry while operating in the vehicle yaw mode provides a forward torque to the outer wheels of the electric vehicle and a backward torque to the inner wheels of the electric vehicle. For example, the processing circuitry may concurrently provide forward torque to the outer wheels of the vehicle and provide backward torque to the inner wheels of the vehicle.

In some embodiments, the processing circuitry receives the inputs for yaw direction and engagement of the vehicle yaw in sequential order. For example, the processing circuitry receives a first input to initiate the vehicle yaw mode and a second input to indicate the yaw direction. In some embodiments, the processing circuitry receives the inputs for yaw direction and engagement of the vehicle yaw concurrently. The inputs for yaw direction and engagement of the vehicle yaw may be received via a input interface, for example, a graphical user interface on a vehicle display. In some embodiments, the inputs may be received via buttons. For example, the processing circuitry may initiate the vehicle yaw mode and the yaw direction after the user issues a command requesting such mode (e.g., by pressing an approximate button, or via any other input).

In some embodiments, the processing circuitry may receive a desired yaw turn angle for the vehicle yaw. For example, the desired yaw turn angle may be a rotational movement around the pivot point in the center of the vehicle (e.g., center of gravity point), thereby causing the vehicle to rotate clockwise or counterclockwise around the pivot point of the vehicle by various degrees. In some instances, the desired yaw turn angle may be one of a 90-degree left rotation (counterclockwise), a 90-degree right rotation (clockwise) and a 180-degree rotation in left or right rotation (clockwise or counterclockwise) from the current position of the vehicle. The desired yaw turn angle may be any value including a full rotation (i.e., 360 degrees in desired yaw turn angle) or a number of full rotations (e.g., 720 degrees, 1080 degrees, etc.). The processing circuitry may monitor the vehicle yaw of the electric vehicle and determine that the vehicle yaw of the electric vehicle has met or exceeded the desired yaw turn angle from a starting position and, in response, disengage the vehicle yaw mode. In some embodiments, in response to disengaging from the vehicle yaw mode, the processing circuitry may engage the normal drive mode and transition all torque applied to each wheel in a forward direction. For example, as the vehicle rotates above a pivot point in the chassis, upon rotating the desired yaw turn angle (e.g., 180 degrees), the vehicle disengages from the vehicle yaw mode and engages normal drive mode. In some embodiments, the processing circuitry may concurrently disengage the vehicle yaw mode and engage the normal drive mode.

In some embodiments, the processing circuitry may provide the forward torque to the outer wheels and the backward torque to rotate the electric vehicle automatically by the electric vehicle, (by the vehicle without any user inputs). For example, for the electric vehicle to turn the desired yaw turn angle or number of rotations, the processing circuitry may automatically (without any user inputs) provide the forward torque to the outer wheels and the backward torque to rotate the electric vehicle. In some embodiments, the processing circuitry may provide a forward torque for the outer wheels and backward torque for the inner wheel in proportion to the user input (e.g., proportionally to how far the user has pressed the accelerator pedal).

In some embodiments, the processing circuitry may receive an input of a number of full vehicle rotations via the vehicle yaw mode or any other mode or no mode at all. For example, the number of full vehicle rotations may be one of 1, 2, 3, 4 or 5 or any number of full rotations from the current position of the vehicle. The single full vehicle rotation may be a vehicle rotating 360 degrees. The processing circuitry may monitor the vehicle yaw of the electric vehicle and determine that the electric vehicle has performed the input of a number of full vehicle rotations from a starting position and, in response, disengage the vehicle yaw mode. In some embodiments, in response to disengaging from the vehicle yaw mode, the processing circuitry may engage the normal drive mode and transition all torque applied to the wheels in a forward direction. For example, as the vehicle rotates about a pivot point in the chassis, upon rotating the input of a number of full vehicle rotations (e.g., two full rotations), the vehicle disengages from the vehicle yaw mode and engages normal drive mode. In some embodiments, the processing circuitry may concurrently disengage the vehicle yaw mode and engage the normal drive mode.

In some embodiments, the processing circuitry may be configured to disengage the vehicle yaw mode. For example, the processing circuitry may determine that an obstruction may exist, or any other criteria are not satisfied. In some embodiments, when the determination is made, the processing circuitry may automatically (without any user inputs) disengage the vehicle yaw mode. In some embodiments, the processing circuitry may disengage the vehicle yaw mode in response to receiving user input (e.g., a key being pressed, or the steering wheel being turned to a position that exceeds a threshold or a forward speed exceeding a speed threshold).

In some embodiments, the processing circuitry may monitor the steering angle of the front wheels. In some examples, the processing circuitry may determine that the amount that at least one of the front wheels of the vehicle is turned exceeds a steering angle threshold (e.g., 10%, 15%, or any other steering angle threshold). In some embodiments, when the amount that at least one of the front wheels of the vehicle is turned exceeds the steering angle threshold, the processing circuitry may manually or automatically straighten the wheels. For example, the vehicle may prompt the user to straighten the wheels (e.g., via a visual reminder or auditory signal). In some embodiments, the processing circuitry may place the wheels of the vehicles parallel with the length of the vehicle (e.g., by automatically turning the wheels.)

In some embodiments, the processing circuitry may provide the forward torque to the outer wheels of the electric vehicle by providing an open-loop forward torque to the outer wheels of the electric vehicle. For example, the processing circuitry performs the vehicle yaw mode in the open-loop without adjusting the output variables (e.g., output of torque is not adjusted based on a sensor, rather torque is ramped up to or set to a specific amount based on a set amount). For example, the torque applied to the outer wheels is ramped up to 4000 Newton-meters (Nm). In some embodiments, ramping the open-loop forward torque includes continuously or gradually increasing the torque. In some embodiments, the torque is increased incrementally in a stepwise pattern up to 4000 Nm. While operating in open-loop, the processing circuitry may provide an open-loop forward torque to outer wheels of the vehicle, such that the torque continues increasing (continuously or gradually) while the accelerator input remains unchanged or substantially unchanged. In some embodiments, forward torque may be provided in proportion to the user input (e.g., proportionally to how far the user has pressed the accelerator pedal). The processing circuitry monitors the slippage of the outer wheels to identify when to provide closed-loop forward torque to the outer wheel. In response to identifying slippage by the outer wheels, the processing circuitry provides closed-loop forward torque.

In some embodiments, while engaged in the vehicle yaw mode, the processing circuitry may provide the backward torque to the inner wheels of the electric vehicle by providing an open-loop backward torque to the inner wheels of the electric vehicle. For example, the torque applied to the inner wheels is ramped up to 4000 Newton-meters (Nm). In some embodiments, ramping the open-loop backward torque includes continuously or gradually increasing the torque. In some embodiments, the torque is increased incrementally in a stepwise pattern up to 4000 Nm. While operating in open-loop, the processing circuitry may provide an open-loop backward torque to inner wheels of the vehicle, such that the torque continues increasing (continuously or gradually) while the accelerator input remains unchanged or substantially unchanged. In some embodiments, backward torque may be provided in proportion to the user input (e.g., proportionally to how far the user has pressed the accelerator pedal). The processing circuitry monitors the slippage of the inner wheels to determine when to provide closed-loop backward torque to the inner wheel. In response to identifying slippage by the inner wheels, the processing circuitry provides closed-loop backward torque.

In some embodiments, the processing circuitry, when engaging the closed-loop, may monitor the rotation of each of the wheels. For example, sensors at each wheel may provide data relating to the rotation of each wheel. In some embodiments, the processing circuitry may also monitor a vehicle yaw rate of the vehicle. For example, one or more sensors distributed around the vehicle may monitor the rate of yaw of the vehicle. In some embodiments, the vehicle may provide torque to each of the one or more wheels, separately or independently, to maintain slippage of each of the wheels as the vehicle rotates (yaws) about a substantially static location. For example, the center of rotation (e.g., pivot point) may remain substantially fixed relative to the ground during vehicle yaw. The static location may be a point under the chassis of the vehicle.

In some embodiments, the processing circuitry, when providing open-loop forward torque to the outer wheels, may provide forward torque to an outer front wheel of the vehicle and an outer rear wheel of the vehicle. For example, the processing circuitry may concurrently provide independent forward torques to the outer front wheel and the outer rear wheel of the vehicle. In some embodiments, forward torque may be provided in proportion to the user input (e.g., proportionally to how far the user has pressed the accelerator pedal). In some embodiments, while operating in the vehicle yaw mode, the outer wheels of the vehicle may slip relative to the ground.

In some embodiments, the processing circuitry, when providing open-loop backward torque to the inner wheels of the vehicle, may provide backward torque to an inner front wheel of the vehicle and an inner rear wheel of the vehicle. For example, the processing circuitry may concurrently provide backward torques to the inner front wheel and the inner rear wheel of the vehicle. In some embodiments, rearward torque may be provided in proportion to the user input (e.g., proportionally to how far the user has pressed the accelerator pedal). In some embodiments, while operating in the vehicle yaw mode, the inner wheels of the vehicle may slip relative to the ground.

In some embodiments, the processing circuitry may compare the rotation of the inner front wheel, rotation of the inner rear wheel, rotation of the outer rear wheel, and the rotation of the outer front wheel to a target spin rate (e.g., 4 revolutions per second spin rate or any other spin rate). For example, the processing circuitry may control the rotation of the inner front wheel, rotation of the inner rear wheel, rotation of the outer rear wheel, and the rotation of the outer front wheel based on the comparison to the target spin rate. In some embodiments, while operating in the closed-loop mode, the processing circuitry may control the forward torque of the outer wheels and the backward torque of the inner wheels such that the rotation of the inner front wheel, rotation of the inner rear wheel, rotation of the outer rear wheel, and the rotation of the outer front wheel do not exceed the target spin rate. For example, the processing circuitry, in response to determining that the rotation of the inner front wheel, rotation of the inner rear wheel, rotation of the outer rear wheel, or the rotation of the outer front wheel is above the target spin rate, may adjust forward torque to the outer wheels or backward torque to the inner wheels of the vehicle based on the determination to prevent wheel and drivetrain wear. In some embodiments, the processing circuitry may apply a brake to one or more of the outer wheels and the inner wheels. In some embodiments, the processing circuitry may reduce forward torque to one or more of the outer wheels or backward torque to the inner wheels.

In some embodiments, the processing circuitry may monitor the vehicle yaw rate. For example, the processing circuitry may receive rotation information of the vehicle from at least one sensor. In some embodiments, the processing circuitry may compare the vehicle yaw rate to a target vehicle yaw rate (e.g., a vehicle revolution per 10 seconds or any other yaw rate). For example, the processing circuitry may control the rotation of the inner front wheel, rotation of the inner rear wheel, rotation of the outer rear wheel, and the rotation of the outer front wheel based on the comparison to the target vehicle yaw rate.

According to another embodiment, a vehicle configured for turning in a vehicle yaw mode or any other mode or no mode at all, is provided. In some embodiments, the vehicle may include front wheels, and rear wheels and each wheel of the front wheels and rear wheels being configured with a motor to provide torque to each respective wheel.

In some embodiments, the vehicle may be configured to include circuitry. In some embodiments, the circuitry may be configured to perform a vehicle yaw mode or any other mode or no mode at all, in response to receiving an input from a user. In some embodiments, while operating in the vehicle yaw mode, the processing circuitry may provide an indication of a yaw direction and forward torque to outer wheels of the vehicle using a motor associated with each wheel and provide a backward torque to inner wheels of the vehicle using a motor associated with each wheel.

In some embodiments, while operating in the vehicle yaw mode or any other mode or no mode at all, the processing circuitry may provide an indication of a yaw direction and open-loop forward torque to outer wheels of the vehicle using a motor associated with each wheel and provide an open-loop backward torque to inner wheels of the vehicle using a motor associated with each wheel.

In some embodiments, each wheel configured with a motor comprises a first motor configured to transmit torque to an outer front wheel, a second motor configured to transmit torque to an inner front wheel, a third motor configured to transmit torque to an outer rear wheel and a fourth motor configured to transmit torque to an inner rear wheel.

In some embodiments, a non-transitory computer-readable medium having instructions encoded thereon for turning a vehicle in a yaw mode or any other mode or no mode at all, is provided. In some embodiments, the encoded instructions may be executed by processing circuitry of a vehicle having front wheels and rear wheels. In some embodiments, the processing circuitry is configured to performing vehicle yaw in an electric vehicle when turning the steering wheel to a certain point, or via any other input. According to some embodiments, while operating in the yaw mode, the processing circuitry based on the encoded instructions, may cause forward torque to be applied to the outer wheels of the vehicle and cause backward torque to be applied to the inner wheels of the vehicle.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 4B depicts an example of a graphical user interface for engaging a vehicle yaw mode, in accordance with some embodiments of the present disclosure;

DETAILED DESCRIPTION

Figure 1:
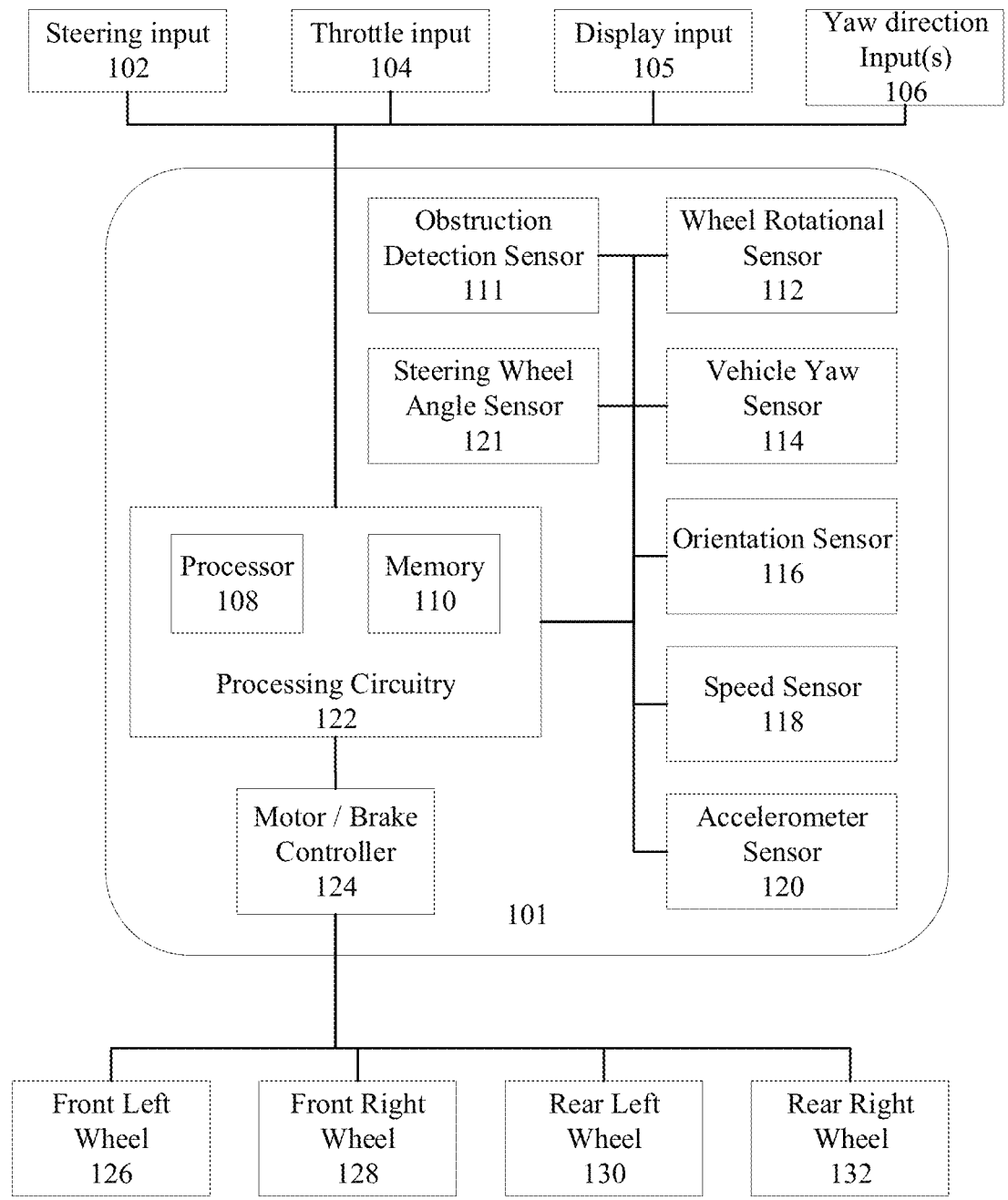
FIG. 1 depicts a system diagram of an illustrative vehicle including processing circuitry, inputs variables, sensors and output variables, in accordance with some embodiments of the present disclosure.

The present disclosure is directed to operating an electric vehicle to perform vehicle yaw. In some embodiments, the vehicle includes a normal driving mode where the electric vehicle is steered by turning one or more wheels left or right using, e.g., a steering wheel. In some embodiments, the vehicle performs a vehicle yaw while engaged in a vehicle yaw mode, a normal driving mode, possibly with various other types of modes as well. In some embodiments, the torque of each wheel of the vehicle may be independently controlled with independent and varying levels of torque to each wheel. In some embodiments, the vehicle may be configured, when certain conditions are met (e.g., when the speed of the vehicle is low enough and/or when the front wheels are aligned parallel to the direction of the vehicle), to operate in the vehicle yaw mode. In some embodiments, the vehicle is configured to receive inputs from the user via a graphical user interface to engage a vehicle yaw mode and indicate a yaw direction. For example, the yaw direction is one of left yaw and right yaw. In some embodiments, based on receiving the yaw direction, the vehicle is configured to determine the inner wheels and the outer wheels of the vehicle. In some embodiments, while operating in the vehicle yaw mode, the vehicle is configured such that forward torque is provided to the outer wheels of the vehicle and backward torque is provided to the inner wheels of the vehicle. The vehicle yaw mode allows a vehicle to pivot around a point under the chassis of the vehicle. Yet, it should be noted that one or more vehicles may pivot under the chassis without the one or more modes of operation described herein. In some instances, the vehicles may perform one or more pivots without any modes selected or engaged. Yet, for purposes of illustration and describing examples without limiting this disclosure, the vehicle capabilities described to pivot around a point, turn with a reduced or minimal turning radius, initiate forward torque to one or more wheels while initiating backwards torque to one or more other wheels, among other examples, may be performed in a normal driving mode, a vehicle yaw mode, while operating in closed-loop or open-loop, and/or a combination of the modes, among other vehicle modes. Yet, these vehicles may perform these operations under multiple modes simultaneously, sequentially, and/or any combination thereof.

As referred to herein, the term "vehicle yaw mode" refers to any kind of mode, a mode triggered automatically without user input, or technique for operating a vehicle such that outer and inner wheels of the vehicle are provided with torques in opposite directions. In some embodiments, the vehicle yaw mode includes independent torque control of each wheel. For example, the outer wheels of the vehicle are operated with independent forward torques and the inner wheels of the vehicle are operated with independent backward torque. In some embodiments, the vehicle yaw mode includes independently controlling each wheel to induce a yawing of the vehicle. For example, the outer front wheel of the vehicle is operated with a first forward torque, the outer rear wheel is operated with a second forward torque, the inner front wheel of the vehicle is operated with a first backward torque and the inner rear wheel is operated with a second backward torque. In some instances, the first forward torque and second forward torque may be different magnitudes and the first backward torque and the second backward torque may be different magnitudes.

As referred to herein, the term "inner wheel" refers to a wheel that is closer to the direction of a turn of the vehicle. For example, during a right turn or yaw, the right wheels (front and back) of the vehicle may be considered "inner wheels," while the left wheels of the vehicle may be considered "outer wheels." In another example, during a left turn or yaw, the left wheels of the vehicle may be considered "inner wheels," while the right wheels of the vehicle may be considered "outer wheels." The term "outer" refers to the wheels on the side of the vehicle that are provided with forward torque and the term "inner" refers to the wheels on the side of the vehicle on which the wheels are provided with backward torque. Accordingly, which wheels of the vehicle are considered the outer and inner wheels will depend on the direction of yaw.

FIG. 1 depicts a system diagram of an illustrative vehicle 100 including processing circuitry 122, input variables 102, 104, 105, 106, sensors 111-121, motor/brake controller 124 and output variables 126-132, in accordance with several embodiments of the disclosure. Illustrative processing circuitry 122 includes processor 108, and memory 110.

Processing circuitry 122 may include hardware, software, or both, implemented on one or more modules configured to provide control of front wheels and rear wheels of a vehicle. In some embodiments, processor 108 includes one or more microprocessors, microcontrollers, digital signal processors, programmable logic devices, field-programmable gate arrays (FPGAs), application-specific integrated circuits (ASICs), or any suitable combination thereof. In some embodiments, processor 108 is distributed across more than one processor or processing units. In some embodiments, processing circuitry 122 executes instructions stored in memory for managing a quad motor vehicle 300, or a triple motor vehicle. In some embodiments, memory 110 is an electronic storage device that is part of processing circuitry 122. For example, memory 110 may be configured to store electronic data, computer instructions, applications, firmware, or any other suitable information. In some embodiments, memory 110 includes random-access memory, read-only memory, hard drives, optical drives, solid-state devices, or any other suitable memory storage devices, or any combination thereof. For example, memory may be used to launch a start-up routine.

In some embodiments, the system may include at least the following non-limiting inputs including steering input 102, throttle input 104, display input 105, and yaw direction input 106. In some embodiments, steering input 102 may be configured to provide an input for turning the steerable wheels, the throttle input 104 may be configured to provide an input for throttle to one or more of wheels 126, 128, 130, 132 of vehicle 100, input interface 105 (e.g., a graphical user interface) may be configured to receive and output information related to the electric vehicle and yaw direction input 106 may be selected from the input interface 105 or as another button, paddle shifter and configured to provide a yaw direction. In some embodiments, the input interface is configured to receive an input from an operator of the vehicle to engage a vehicle yaw mode and indicate a yaw direction.

In some embodiments, the system may include obstruction detection sensors 111, wheel rotation sensors 112, vehicle yaw sensors 114, orientation sensors 116, speed sensor 118, accelerometer sensor 120 and steering wheel sensor 121. In some embodiments, the processing circuitry 122 may be communicatively connected to one or more obstruction detection sensors 111 to monitor for obstructions around the vehicle. In some embodiments, the processing circuitry 122 may be communicatively connected to one or more wheel rotation sensors 112 that provide data indicative of the wheel rotation of each of wheels 126, 128, 130, 132 of the vehicle. In some instances, one or more wheel rotation sensors 112 may be connected to a steering column of the vehicle 300 to determine a turn angle for each of the one or more wheels 126, 128, 130, and/or 132. In some embodiments, based on the data provided by the wheel rotation sensor, the processing circuitry 122 may determine if a wheel is slipping and in response may transition from an open-loop control to a closed-loop control of torque in vehicle yaw mode. In some embodiments, the processing circuitry 122 may be communicatively connected to one or more vehicle yaw sensors 114 that provide data indicative of the rotation of the vehicle. In some embodiments, the processing circuitry 122 may be communicatively connected to one or more orientation sensors 116 that provide data indicative of the orientation of vehicle 100 in 3D space. For example, orientation sensors 116 may provide data indicative of a pitch angle of vehicle 100, yaw angle of vehicle 100, and roll angle of vehicle 100. In some embodiments, the vehicle yaw or yaw rate may be determined by one or more orientation sensors 116. The orientation sensors 116 may provide data indicative of the orientation of vehicle 100. The yaw rate can be determined by calculating a change in orientation over time. In some embodiments, the processing circuitry 122 may be communicatively connected to a speed sensor 118 that provides the current speed of vehicle 100. In some embodiments, the processing circuitry 122 may be communicatively connected to an accelerometer sensor 120 that provides the current acceleration of vehicle 100. In some embodiments, the processing circuitry 122 may be communicatively connected to a steering wheel sensor 121 that determines the steering angle of the steerable wheels (e.g., 126 and 128) of vehicle 100. In some embodiments, in response to determining the steering angle of the steering wheels with the steering wheel sensor 121, the processing circuitry 122 may turn the steerable wheels to reduce the wheel angle before engaging vehicle yaw mode. In some embodiments, the determined steering angles may be compared to threshold angle (e.g., 10 degrees) before engaging vehicle yaw mode. In some embodiments, before engaging the vehicle yaw mode and in response to the determined wheel angle exceeds the threshold angle, the processing circuitry 122 may turn the steering wheel to reduce the wheel angle. In some embodiments, in response to engaging the vehicle yaw mode, the vehicle 100 may cause the wheels 126 and 128 of vehicle 100 to automatically straighten (e.g., aligned to be parallel to the length of the vehicle).

Figure 5:
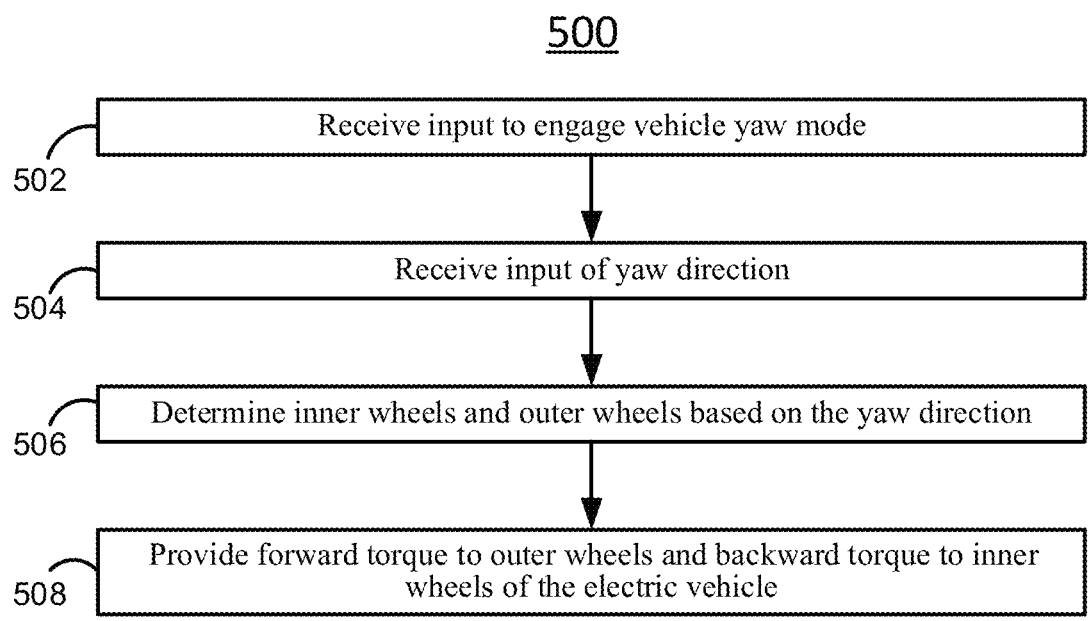
FIG. 5 depicts an illustrative flow diagram of a process for operating a vehicle in a vehicle yaw mode, in accordance with some embodiments of the present disclosure.
Figure 6:
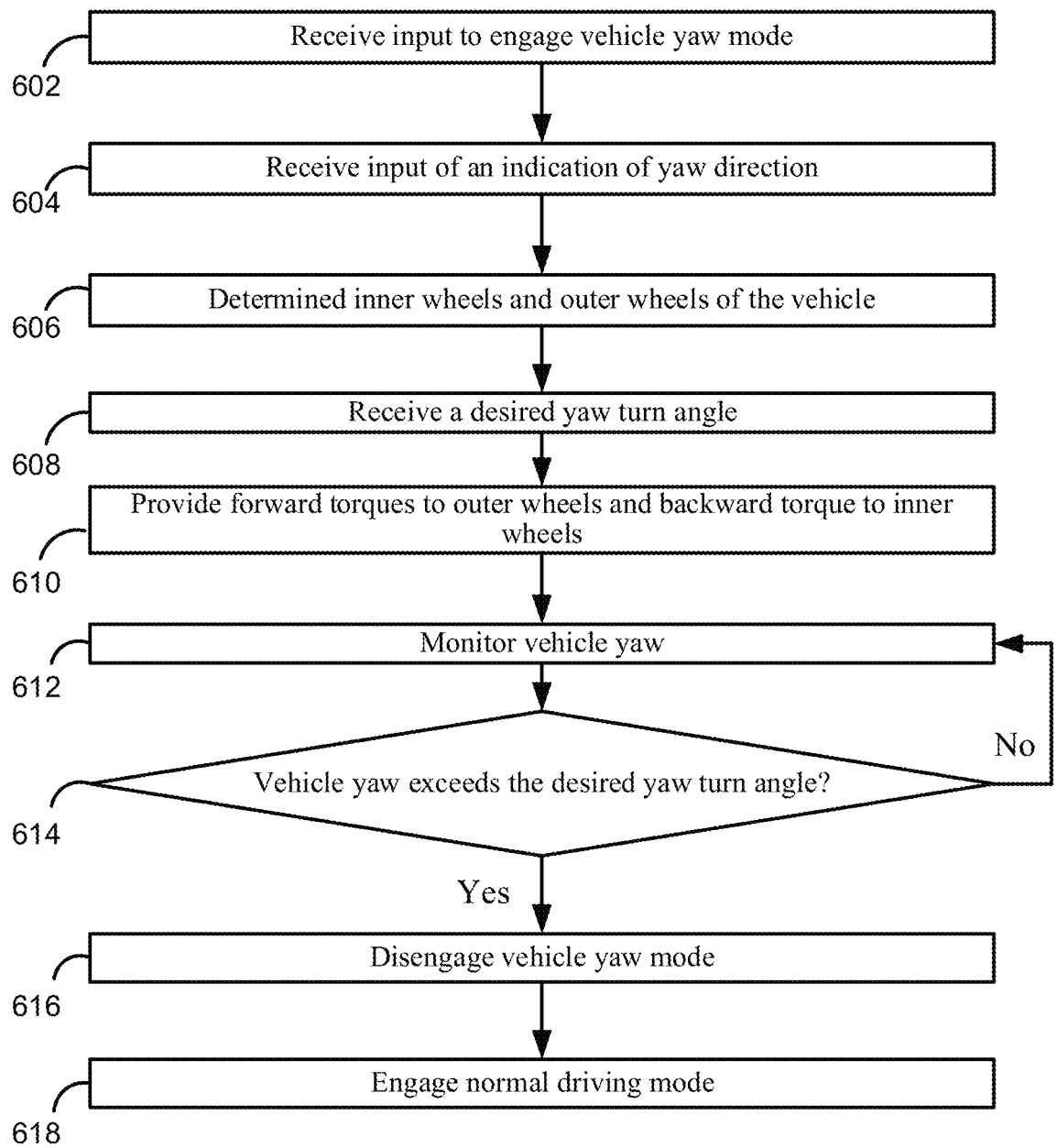
FIG. 6 depicts an illustrative flow diagram of a process for operating in and disengaging a vehicle yaw mode of the vehicle, in accordance with some embodiments of the present disclosure.

Illustrative vehicle 100 of FIG. 1 may be used to perform any or all of the illustrative steps of processes 500 and 600 of FIGS. 5 and 6, respectively. Illustrative vehicle 100 of FIG. 1 may be used to control any of the wheel/motor configurations shown in FIG. 3, in accordance with the present disclosure. In some embodiments, not all components shown in FIG. 1 need to be included in vehicle 100.

Figure 2:
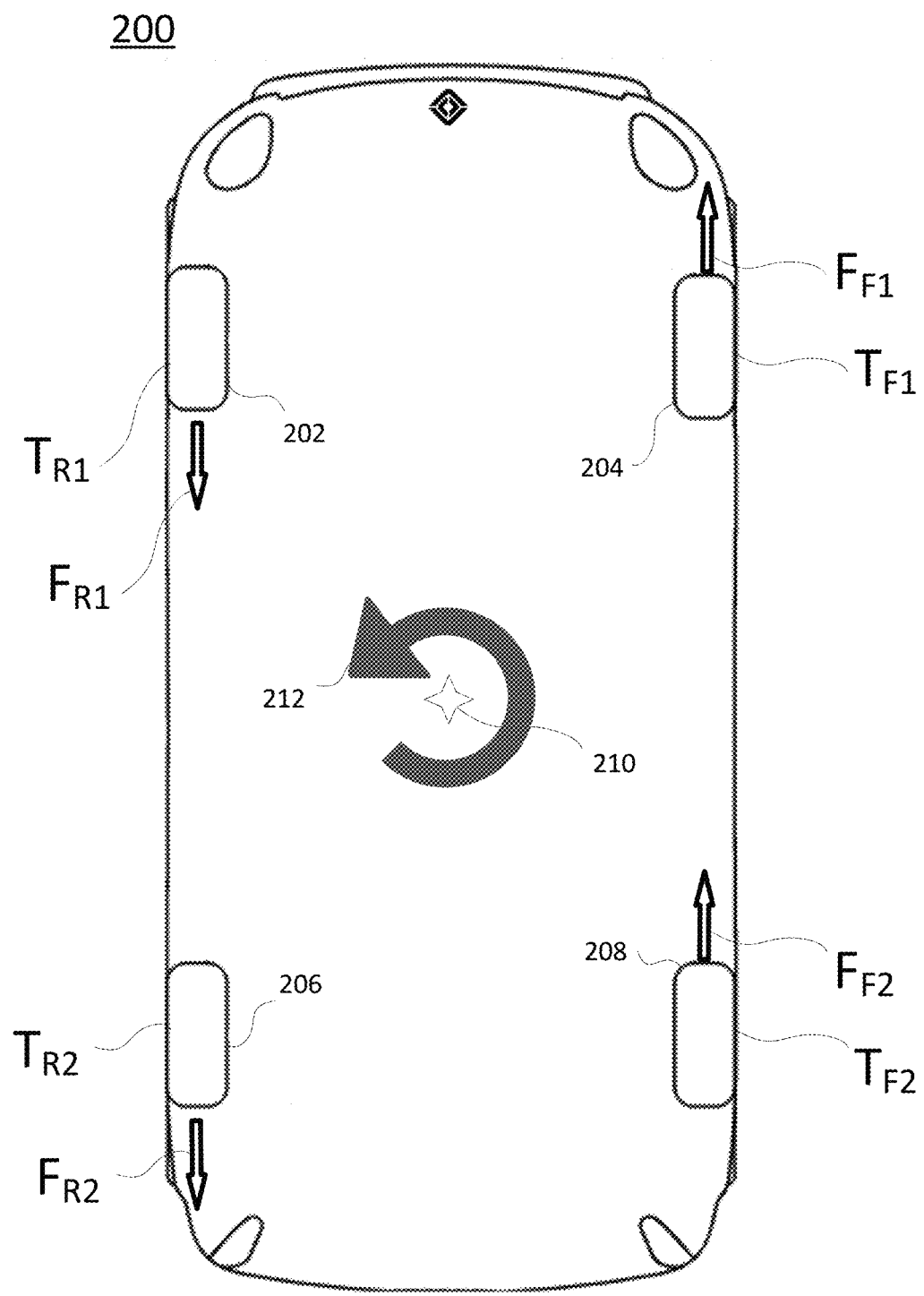
FIG. 2 shows a top cross-sectional view of an illustrative vehicle in accordance with some embodiments of the present disclosure.

FIG. 2 shows a top view of an illustrative vehicle 200 in accordance with some embodiments of the present disclosure. In some embodiments, vehicle 200 may be a coupe, a sedan, a truck, a sport utility vehicle, a full-size van, a minivan a delivery van, a bus, or any other type of vehicle.

In some embodiments, vehicle 200 may include a front left wheel 202, front right wheel 204, rear left wheel 206, and rear right wheel 208. In some embodiments, front left wheel 202 and front right wheel 204 may be connected via a drive shaft (not shown). In some embodiments, when making a left yaw, vehicle 200 may provide backward torques ($T_{R1}$ and $T_{R2}$) to the inner wheels (e.g., front left wheel 202 and rear left wheel 206). In some embodiments, the vehicle may provide forward torques ($T_{F1}$ and $T_{F2}$) to the outer wheels (e.g., front right wheel 204 and rear right wheel 208). For example, the vehicle may provide forward torque $T_{F1}$ to the front right wheel 204 and may further provide forward torque $T_{F2}$ to the rear right wheel 208. In some embodiments, the vehicle may provide backward torques ($T_{R1}$ and $T_{R2}$) to the inner wheels (e.g., front left wheel 202 and rear left wheel 206). For example, the vehicle 200 may provide backward torque $T_{R1}$ to the front left wheel 202 and may further provide backward torque $T_{R2}$ to the rear left wheel 206.

In some embodiments, the forward torques ($T_{F1}$ and $T_{F2}$) may cause forward forces to be exerted on the outer wheels 204 and 208 by the ground. For example, the front forces may provide forward force components ($F_{F1}$ and $F_{F2}$). In some embodiments, the backward torques ($T_{R1}$ and $T_{R2}$) may cause rearward force components ($F_{R1}$ and $F_{R2}$) to be exerted on the inner wheels 202 and 206 of vehicle 200 by the ground. On a relatively consistent ground surface, this causes the vehicle 200 to rotate 212 about a point 210 under the chassis of vehicle 200. Assuming the forward torque to the outer wheels (204 and 208) and the backward torque to the inner wheels (202 and 206) are maintained, an exemplary equation illustrating that the sum of these forces is satisfied as follows:

$$T_{F1}+T_{F2} \approx T_{R1}+T_{R2} \qquad \text{(Eq. 1)}$$

In some embodiments, assuming the forward torque to the outer wheels (204 and 208) and the backward torque to the inner wheels (202 and 206) are maintained, the vehicle yaw rate is expected to be proportional to a sum of the forward torques ($T_{F1}$ and $T_{F2}$) and the backward torques ($T_{R1}$ and $T_{R2}$), as illustrated by an exemplary equation as follows:

$$\Sigma \vec{\tau} \, \alpha \text{Yaw Rate(Proportional)} \qquad \text{(Eq. 2)}$$

In some embodiments, the sum of the backward torques ($T_{R1}$ and $T_{R2}$) exerted on the inner wheels (202 and 206) and the sum of the forward torques ($T_{F1}$ and $T_{F2}$) exerted on the outer wheels (204 and 208) causes the vehicle 200 to rotate 212 about point 210 under the chassis of vehicle 200 while the vehicle remains in a substantially static location. For example, as the backward torque is applied to the inner wheels (202 and 206) and the forward torque is applied to the outer wheels (204 and 208), the forces cause the vehicle 200 to rotate about a central point 210 while the vehicle 200 remains in the same location. In some embodiments, the forward torques ($T_{F1}$ and $T_{F2}$) may cause the outer wheels (204 and 208) to slip relative to the ground and backward torques ($T_{R1}$ and $T_{R2}$) may cause the inner wheels (202 and 206) to slip relative to the ground. As the outer wheels (204 and 208) slip forward and the inner wheels (202 and 206) slip backward, the combination of the resulting forward force components ($F_{F1}$ and $F_{F2}$) and the backward force components ($F_{R1}$ and $F_{R2}$) act on the vehicle 200 and rotate 212 the vehicle 100 about point 210. For example, the force components may cause the vehicle 200 to pivot around a point 210 under the chassis of the vehicle.

In some embodiments, vehicle 200 may operate in vehicle yaw mode in both directions (e.g., clockwise and counter-clockwise). In some embodiments, vehicle 200 may receive an indication of the yaw direction. For example, the vehicle 200 may receive an indication of a left yaw, which will result in the vehicle yaw to the left (counterclockwise). In another example, the vehicle 200 may receive an indication of a right yaw, which will result in the vehicle yaw to the right (clockwise). FIG. 2 depicts a left yaw; however, those skilled in the art will recognize that similar techniques can be used to perform a right yaw.

Figure 3:
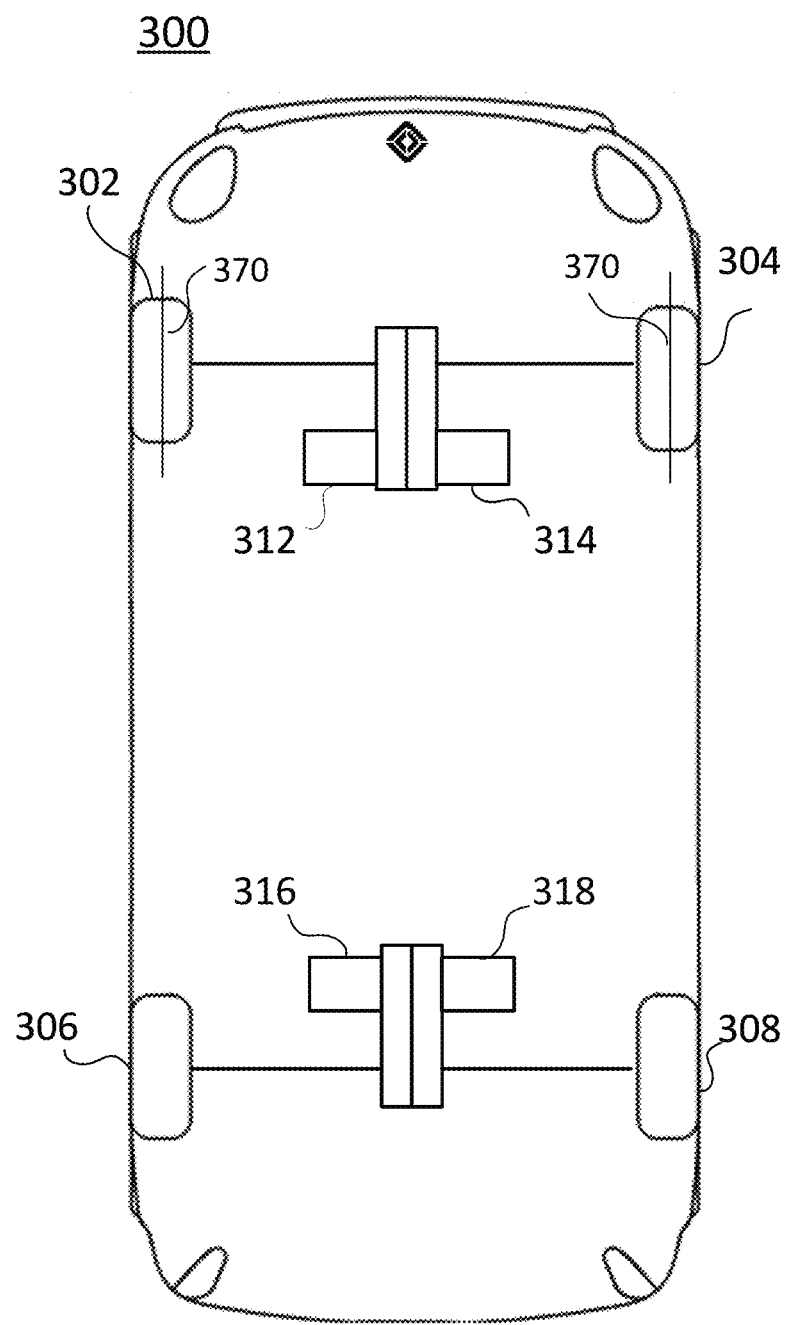
FIG. 3 shows another top cross-sectional view of an illustrative vehicle in accordance with some embodiments of the present disclosure.

FIG. 3 shows a top view of an illustrative vehicle 300 in accordance with some embodiments of the present disclosure. In some embodiments, vehicle 300 may be a coupe, a sedan, a truck, a sport utility vehicle, a full-size van, a minivan, a delivery van, a bus, or any other type of vehicle.

In some embodiments, vehicle 300 may include a front left wheel 302, front right wheel 304, rear left wheel 306, and rear right wheel 308. In some embodiments, vehicle 300 may include a motor 312. Motor 312 may be connected to front left wheel 302 (e.g., via a belt, chains, gears, or any other connection device). Vehicle 300 may also include motors 314, 316, 318, which are similarly connected to wheels 304, 306, 308, respectively. In some embodiments, motors 312, 314, 316, and 318 may be configured to provide forward torque or backward torque to their respective wheels 302, 304, 306, and 308.

In some embodiments, motors 312, 314, 316, and 318 may be any kind of motors capable of generating power (e.g., gas motors, electric motors). In some embodiments, motors 312, 314, 316, and 318 may be devices connected to a primary single motor (not shown) and configured to independently and instantaneously transfer power from a single motor to wheels 302, 304, 306, and 308, respectively.

In some embodiments, vehicle 300 may include processing circuitry 122 of FIG. 1. In some embodiments, the processing circuitry 122 may include an on-board vehicle computer that is capable of controlling multiple features or capabilities of the vehicles. In some embodiments, processing circuitry 122 may be communicatively connected with user inputs 102, 104, 105, 106 of the vehicle, sensors of the vehicle 111-120, and transitory or non-transitory memory (e.g., memory that stores institutions for operating the vehicle).

In some embodiments, vehicle 300 may include a plurality of sensors. For example, some of the plurality of sensors may include speed sensor 118 for determining speed of vehicle 300, the steering wheel angle sensor 121 to which the front wheels 302, 304 of vehicle 300 are turned, vehicle rotation sensor 114 to determine the rotation of the vehicle 300 in the vehicle yaw mode, wheel rotation sensors 112 to determine the slipping of each of the wheels 302, 304, 306, and 308 of vehicle 300, and accelerometer sensor 120 to determine the acceleration of the vehicle.

In some embodiments, the processing circuitry 122 of vehicle 300 may be capable of directly controlling features of vehicle 300 with or without user input. In one example, processing circuitry 122 may be able to actuate motor 312 to provide a specified amount of backward or forward torque to front left wheel 302. Similarly, processing circuitry 122 may be able to actuate any of motors 314, 316, 318 to provide a specified amount of backward or forward torque to wheels 304, 306, 308, respectively.

In some embodiments, the processing circuitry 122 of vehicle 300 may engage the vehicle yaw mode when one or more conditions are met. For example, a user may press a button or turn a lever to request the vehicle yaw mode. Yet, the vehicle yaw mode may be engaged without a user input. In some embodiments, instead, or in addition to the user request, the processing circuitry 122 may receive an indication of yaw direction of the vehicle 300 that is requested. For example, the yaw direction may be right yaw (clockwise) or left yaw (counterclockwise). In some embodiments, the processing circuitry 122 may determine whether front wheels 302 and 304 are aligned to be parallel to the vehicle 300. In some embodiments, for the vehicle yaw mode to activate, wheels 302 and 304 need to be aligned to be parallel to the vehicle 300. For the vehicle yaw mode to reduce turn radius and increase efficiency in turning the vehicle 300, the wheels 302 and 304 may be within 10% of the center 370 (e.g., aligned to be parallel to the length of the vehicle 300). For example, the steering wheels 302 and 304 can be positioned within 10% of the center 370 (e.g., aligned to be parallel to the length of the vehicle 300). In some embodiments, when the front wheels 302 and 304 are not aligned to be parallel to the vehicle 300, the processing circuitry 122 may automatically rotate the steering wheel to align the front wheels 302 and 304 to be parallel to the vehicle 300 (e.g., straightening the wheels). In some embodiments, the direction to which the front wheels 302 and 304 are turned may determine the yaw direction. For example, if the vehicle's front wheels 302 and 304 are turned 5% to the right, the processing circuitry 122 may determine the yaw direction to be right yaw. In some embodiments, the direction to which the front wheels 302 and 304 are turned may be greater than the 10% turn of the center 370 (e.g., aligned to be parallel to the length of the vehicle 300), and in response, the processing circuitry 122 may automatically rotate the steering wheel to align the front wheels 302 and 304. In some embodiments, the one or more front wheels 302 and 304 of the vehicle 300 may be the steering wheels. In some embodiments, the one or more rear wheels 306 and 308 of the vehicle 300 may be the steering wheels. In another embodiment, the one or more rear wheels 306 and 308 and the one or more front wheels 302 and 304 may be the steering wheels. In some embodiments, the processing circuitry 122 may turn the wheels to align with center 370 (i.e., for the wheels to be parallel to the length of the vehicle 300) and use the direction to which the steering wheels were turned as the yaw direction.

In some embodiments, while operating in vehicle yaw mode, the processing circuitry 122 of vehicle 300 may engage an open-loop mode. In the open-loop mode, the processing circuitry 122 may provide forward torque to outer wheels 304, 308 (e.g., by using motors 314 and 318). In some embodiments, the processing circuitry 122 may apply backward torque to the inner wheels 302 and 306 of vehicle 300, for example, by using motors 312 and 316. The open-loop mode performs the vehicle yaw mode without adjusting the output variables (e.g., output of torque is not adjusted based on a sensor, rather torque is ramped up to or set to a specific amount based on user input). For example, the torque applied to the inner wheels and outer wheels is ramped up to 4000 Newton-meters (Nm). In some embodiments, ramping the open-loop forward torque and open-loop backward torque includes continuously increasing the torque, for example, from zero to 4000 Nm. In some embodiments, the torque is increased incrementally in a stepwise pattern up to 4000 Nm. For example, the torque is increased in 200 Nm increments (e.g., 200, 400, 600, 800, etc.) up to 4000 Nm. In another example, the torque is increased in varying increments (e.g., 200, 500, 1000).

The foregoing FIG. 3 is merely illustrative of the principles of this disclosure, and various modifications may be made by those skilled in the art without departing from the scope of this disclosure. The above-described embodiments are presented for purposes of illustration and not of limitation. For example, any combination of motors and drivetrains may be used in a vehicle 300 in accordance with the present disclosure. In some examples, the rear motors 316 and 318 of FIG. 3 may be used in combination with a single front motor 312. According to such a configuration, the vehicle 300 includes three motors (one front motor 312 and two rear motors 316 and 318). In another example, a single rear motor 316 may be used in combination with the two front motors 312 and 314 of FIG. 3. According to such a configuration, the vehicle 300 includes three motors (two front motors 312 and 314 and one rear motor 316).

In some embodiments, the vehicle yaw mode may be used on a vehicle with any combination of axles in accordance with the present disclosure. For example, the vehicle 300 may have a steered axle and a non-steered axle. The steered axle may be coupled to one wheel or a plurality of wheels that will steer the vehicle 300 in a direction. In some embodiments, the steered axle may be provided at the front or rear of the vehicle 300. For example, as the user provides an input to steer the vehicle, the front or rear wheels will turn. In some embodiments, the non-steered axle may be coupled to one wheel or a plurality of wheels that will provide torque to the vehicle. In some embodiments, the vehicle may provide two axles (e.g., steered and non-steered axles), as shown in the configuration displayed in vehicle 300 (FIG. 3). In some embodiments, the vehicle may provide three or more axles. For example, the three or more axles may provide at least one steered axle and two or more non-steered axles. According to such a configuration, when the at least one steered axle is turned such that the corresponding wheels are aligned to be parallel to the vehicle, the vehicle yaw mode may be engaged. In some embodiments, the at least one steered axle may include a motor at each wheel. In some embodiments, each motor may provide forward torque to the vehicle on one wheel and backward torque to the vehicle at the other wheel attached to the steering axle. In some embodiments, the two or more non-steered axles may provide backward torque on the same side of the vehicle corresponding to backward torque of steering axle, and provide forward torque on the same side of the vehicle corresponding to forward torque of the steering axle, in accordance with the present disclosure.

In some embodiments, the vehicle yaw mode or any other mode or no mode at all, can be used in any vehicle capable of distributing torque and/or braking to the wheels of the vehicle. For example, the vehicle may provide for independent distributing of torque to the outer wheels and the inner wheels. According to another example, the vehicle may provide for independent and varying levels of distribution of torque and braking to the inner wheels and the outer wheels.

The foregoing enables a driver to have accurate control of the point (210) (e.g., center of rotation), and thus turn radii, in the vehicle yaw mode.

Figure 4A:
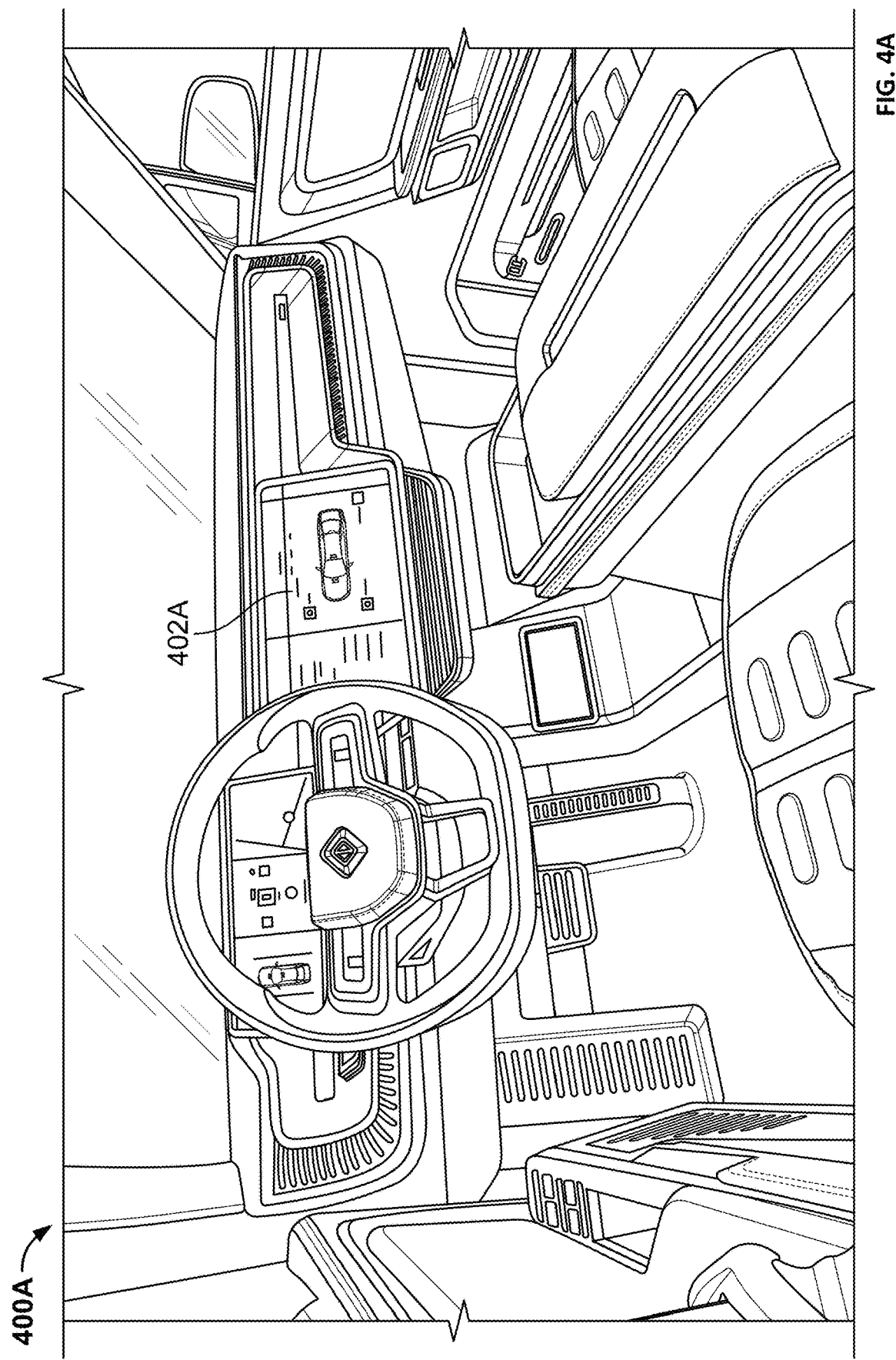
FIG. 4A depicts an illustrative example of a vehicle featuring a graphical user interface, in accordance with some embodiments of the present disclosure.

FIG. 4A depicts an illustrative example of a vehicle 400A featuring a graphical user interface 402A, in accordance with some embodiments of the present disclosure. In some embodiments, a graphical user interface 402A may refer to components incorporated into, coupled to, or accessible by a vehicle such as a vehicle 400A in FIG. 4A. The vehicle 400A is equipped with a graphical user interface 402A that may be used to enable/disable vehicle systems including options to enable and disable vehicle yaw mode, vehicle drive mode or any other mode. For example, a user in vehicle 400A may use the graphical user interface 402A to access options on the vehicle 400A. In some embodiments, the graphical user interface 402A may be incorporated into vehicle 400A or user equipment used to access such vehicle system while using vehicle 400A. In some embodiments, vehicle systems displayed on the graphical user interface 402A may be communicatively connected with user inputs (e.g., microphone and speakers for providing voice command) of the vehicle 400A. For example, the user may provide a voice command to activate the vehicle yaw mode and the audio system incorporated into vehicle 400A may convert such a command to engage the vehicle yaw mode.

As discussed above, in some embodiments, a user or occupant of the vehicle 400A may select the vehicle yaw mode incorporated into or accompanying the graphical user interface 402A by direct input into the user interface (e.g., activating the system via user interface 400B FIG. 4B). Upon a user's selection of the user interface 400B (e.g., selection of a vehicle mode option), an option 402B appears for vehicle yaw mode 404B on the user interface 400B, as shown in illustrative example in FIG. 4B. The vehicle yaw mode option 404B corresponds to a selectable option that the user can enter to engage the vehicle yaw mode. When the user or occupant of the vehicle accesses the vehicle yaw mode via the user interface (e.g., user input interface 400B (FIG. 4B)) incorporated into or accompanying the graphical user interface 402A, the user may engage such a mode using the check mark option 408B.

Figure 4C:
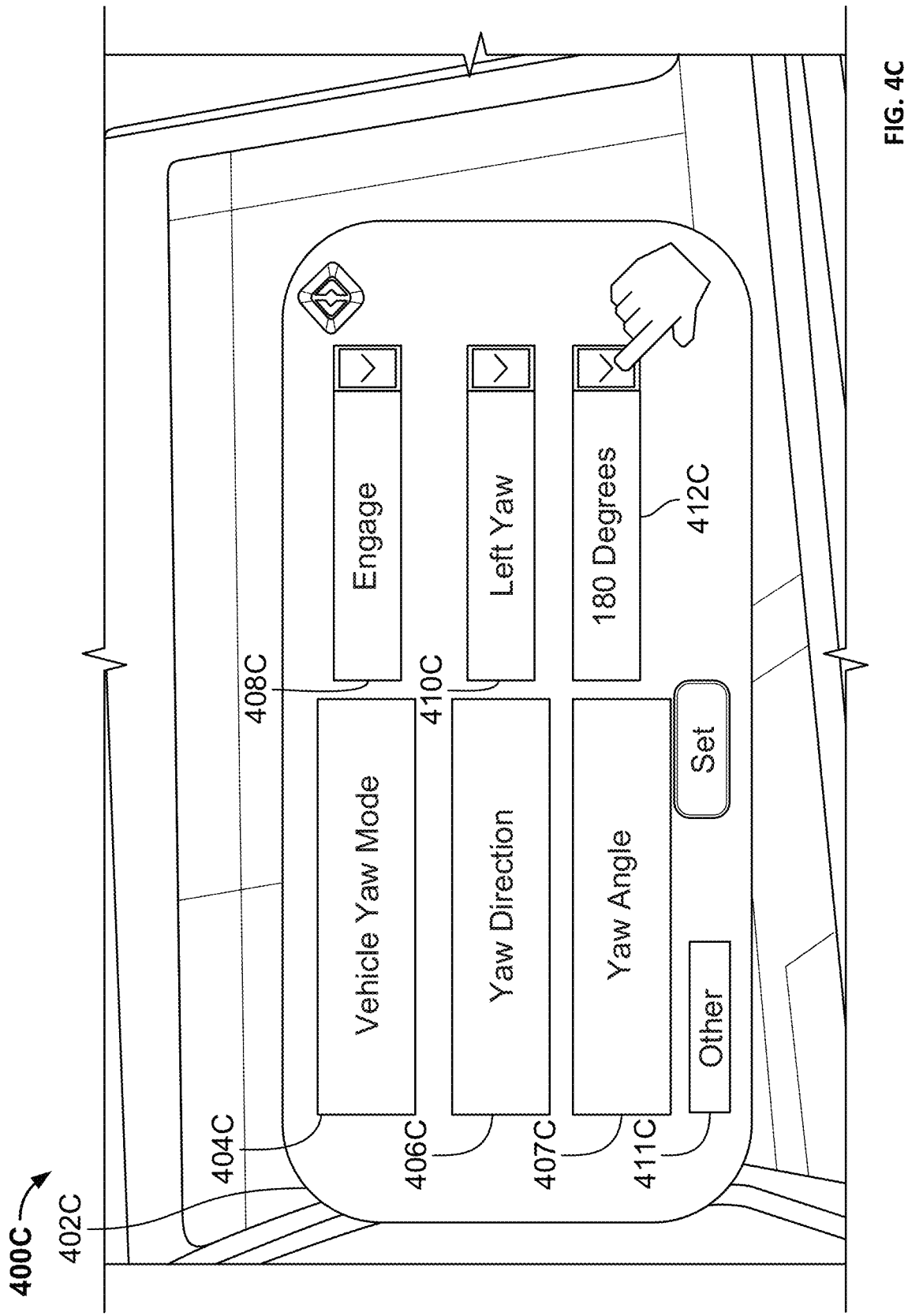
FIG. 4C depicts another example of a graphical user interface for an alternative way of engaging yaw mode, in accordance with some embodiments of the present disclosure.

In some embodiments, a user or occupant of the vehicle 400A may select an alternative way of engaging vehicle yaw mode by specifying the vehicle yaw direction, and turn angle, incorporated into or accompanying the graphical user interface 402A by direct input into the user interface (e.g., activating the system via user interface 400C FIG. 4C). Upon a user's selection of an alternative way of engaging yaw mode of the user interface 400C (e.g., selection of a vehicle mode option), a list 402C appears with options of vehicle yaw mode 404C, including yaw direction 406C, yaw angle 407C, and other option 411C on the user interface 400C, as shown in illustrative example in FIG. 4C. Each of the listed options 404C, 406C, 407C, and 411C correspond to selectable options that the user can enter. For example, for drive mode 404C, the user may enter any one of the non-limiting options, such as engage, disengage, and safety code activation. For example, for yaw direction 406C, the user may enter left yaw or right yaw. Further, for yaw angle 407C, the user may enter a specific desired angle for the yaw. In some embodiments, the desired turn angle may be set to a default value. Further, for other option 411C, the user may enter any one of non-limiting options, such as engage safety restrictions, disengage safety restrictions, safety restrictions, and a maximum rotations limit, among other possibilities potentially involving turning assistance and/or parking assistance. When the user or occupant of the vehicle selects one of the drive modes (e.g., vehicle yaw mode) via the user interface (e.g., user input interface 400C (FIG. 4C)) incorporated into or accompanying the graphical user interface 402A, the user may engage such a mode using the engage option 408C while the selected options corresponding to the drive mode are displayed on the display screen 402C and enter the yaw direction (e.g., left or right yaw) and the amount of yaw (e.g., 90-degrees).

In one embodiment, the vehicle has autonomous vehicle functionality, such as sensing its environment and moving safely with little or no human input, including performing vehicle yaw mode to reduce turn radius and increase efficiency in turning the vehicle. The vehicle can be an Internet-connected vehicle, a vehicle that can communicate bidirectionally with other systems outside of the vehicle. The vehicle can communicate bidirectionally via an antenna array with a map database to facilitate a ride that includes performing vehicle yaw.

FIG. 5 depicts an illustrative flow diagram of a process 500 for operating a vehicle in vehicle yaw mode in accordance with several embodiments of the disclosure.

In some embodiments, process 500 may be executed by processing circuitry 122 of vehicle 300 (FIG. 3). It should be noted that process 500 or any step thereof could be performed on, or provided by, the system of FIG. 1. In addition, one or more steps of process 500 may be incorporated into or combined with one or more other steps described herein.

Process 500 begins at 502, where the processing circuitry 122 may receive input to engage vehicle yaw mode. For example, the processing circuitry 122 may initiate the vehicle yaw mode after the user issues a command requesting such mode (e.g., by pressing an approximate button or via an input on a graphical user interface 402A, or any other input). The processing circuitry 122 may determine whether one or more yaw mode initialization criteria are met. For example, referring back to FIG. 3, whether a turn amount or angle of the front wheels of the vehicle is satisfied (e.g., the turn angle of wheels 302 and 304)). In some embodiments, the processing circuitry 122 may use a sensor connected to a steering column to determine the turn angle of the wheels 302 and 304.

Process 500 continues at 504, where the processing circuitry 122 may proceed depending on the outcome of step 502. For example, if the number of engagement criteria is satisfied, the processing circuitry may proceed to step 504. At 504, the processing circuitry 122 may receive input of a yaw direction. As part of performing the vehicle yaw, the processing circuitry 122 receives the direction that the vehicle yaw is to be performed. For example, based on receiving a yaw direction to the right or to the left, the processing circuitry 122 may perform steps 506 and 508.

At 506, the processing circuitry 122 may determine the inner wheels and the outer wheels based on the yaw direction. For example, in response to receiving an indication of a right yaw, the processing circuitry 122 determines that the left side wheels (302 and 306) are the outer wheels and the right-side wheels (304 and 308) are the inner wheels. In another example, in response to receiving an indication of a left yaw, the processing circuitry 122 determines that the left side wheels (302 and 306) are the inner wheels and the right-side wheels (304 and 308) are the outer wheels.

At 508, the processing circuitry 122 may provide a backward torque to inner wheels of the vehicle and forward torque to the outer wheels of the vehicle. For example, the processing circuitry 122 may actuate motors 312 and 316 to provide backward torque to wheels 302 and 306. Further, the processing circuitry 122 may actuate motors 314 and 318 to provide forward torque to wheels 304 and 308. In some embodiments, step 508 is performed in response to a user pressing an accelerator pedal or in response to a user pressing an option on a graphical user interface of the vehicle. In some embodiments, step 508 starts ramping up torque in an open-loop mode (i.e., without adjusting the torque based on monitoring of any sensor data). For example, in the open-loop mode, torque ramps up regardless of the accelerator pedal input. Generally, the torque is increased until wheel slippage is detected and the vehicle engages closed-loop mode.

FIG. 6 depicts an illustrative flow diagram of a process 600 for operating in and disengaging a vehicle yaw mode of the vehicle. In some embodiments, process 600 may be executed by processing circuitry 122 of vehicle 300 (FIG. 3). It should be noted that process 600 or any step thereof could be performed on, or provided by, the system of FIG. 1. In addition, one or more steps of process 600 may be incorporated into or combined with one or more other steps described herein.

Process 600 begins at 602, where the processing circuitry 122 may receive input to engage vehicle yaw mode. For example, the processing circuitry 122 may initiate the vehicle yaw mode after the user issues a command requesting such mode (e.g., by pressing an approximate button, or via an input on a graphical user interface 402A, or any other input). The processing circuitry 122 may determine whether one or more yaw mode initialization criteria are met. For example, whether a turn degree to which of the front wheels of the vehicle is satisfied (e.g., the turn angle of wheels 302 and 304)). In some embodiments, the processing circuitry 122 may use a sensor connected to a steering column to determine the turn angle of the wheels.

Process 600 continues at 604, where the processing circuitry 122 may proceed depending on the outcome of step 602. For example, if the number of engagement criteria is satisfied, the processing circuitry 122 may proceed to step 604. At 604, the processing circuitry 122 may receive input of a yaw direction. As part of performing the vehicle yaw, the processing circuitry 122 receives the direction that the vehicle yaw is to be performed. For example, based on receiving a yaw direction to the right or to the left, the processing circuitry 122 may perform steps 606 and 608.

At 606, the processing circuitry 122 may determine the inner wheels and the outer wheels based on the yaw direction. For example, in response to receiving an indication of a right yaw, the processing circuitry 122 determines that the left side wheels (302 and 306) are the outer wheels and the right-side wheels (304 and 308) are the inner wheels. In another example, in response to receiving an indication of a left yaw, the processing circuitry 122 determines that the left side wheels (302 and 306) are the inner wheels and the right-side wheels (304 and 308) are the outer wheels.

At 608, the processing circuitry 122 may receive a desired yaw turn angle. For example, the desired yaw turn angle may be one of 90-degree left rotation, a 90-degree right rotation and a 180-degree rotation in left or right rotation from the current position of the vehicle. The desired yaw turn angle may be any value including a full rotation (i.e., 360 degrees in desired yaw turn angle) or a number of full rotations (e.g., 720 degrees, 1080 degrees, etc.).

At 610, the processing circuitry 122 may provide a backward torque to inner wheels of the vehicle and forward torque to the outer wheels of the vehicle. For example, the processing circuitry 122 may actuate motors 312 and 316 to provide backward torque to inner wheels 302 and 306. Further, the processing circuitry 122 may actuate motors 314 and 318 to provide forward torque to outer wheels 304 and 308. In some embodiments, step 610 is performed in response to a user pressing an accelerator pedal or in response to a user pressing an option on a graphical user interface 402A of the vehicle. Yet, in some embodiments, step 610 may be performed in response to the vehicle steering wheel turning beyond a threshold point, e.g., two steering wheel rotations in either direction. In some instances, step 610 may be performed in response to the steering wheel turning beyond a threshold point withing a short time period, e.g., two to five seconds. In some embodiments, step 610 starts ramping up torque in an open-loop mode (i.e., without adjusting the torque based on monitoring of any sensor data). For example, in the open-loop mode, torque ramps up regardless of the accelerator pedal input. Generally, the torque is increased until wheel slippage is detected and the vehicle engages closed-loop mode.

In some embodiments, at 612, the processing circuitry 122 may monitor the vehicle yaw or yaw rate. In some embodiments, the vehicle yaw or yaw rate is determined by one or more vehicle orientation sensors. The vehicle's orientation sensors provide data indicative of the orientation of the vehicle. The yaw rate can be determined by calculating a change in orientation over time. In some embodiments, the processing circuitry 122 may be communicatively connected to one or more orientation sensors that provide data indicative of the orientation of vehicle in 3D space. For example, orientation sensors 116 of FIG. 1 may provide data indicative of a pitch angle of vehicle 200, yaw angle of vehicle 200, and roll angle of vehicle 200.

In some embodiments, the process 600 continues at 614, where the processing circuitry 122 may determine whether the vehicle yaw has exceeded the desired yaw turn angle. In response to determining by the processing circuitry 122 that the vehicle yaw has exceeded the desired yaw turn angle, process 600 continues at 616 to disengage vehicle yaw mode. In some embodiments, in response to disengaging from the vehicle yaw mode, the processing circuitry 122 may engage the normal drive mode at 618 and transition all torque applied to the wheels in a forward direction. For example, as the vehicle rotates above a pivot point 210 in the chassis, upon rotating the desired yaw turn angle (e.g., 180 degrees), the vehicle 200 disengages from the vehicle yaw mode and engages normal drive mode. In some embodiments, the processing circuitry 122 may concurrently disengage the vehicle yaw mode and engage the normal drive mode. In some embodiments, the amount of forward torque provided to the outer wheels and the inner wheels is based on the amount the accelerator pedal is pressed. For example, the amount of torque may be proportional to the amount the accelerator pedal is pressed or may be determined using a look-up table. On the other hand, in response to determining by the processing circuitry 122 that the vehicle yaw has not exceeded the desired yaw turn angle, process 600 continues step 612 by continuing to monitor the vehicle yaw rate.

It will be understood that process 600 is merely illustrative and various modifications can be made within the scope of the disclosure. For example, in some embodiments, steps 608, 612, and 614 can be omitted and step 610 can be performed in response to the accelerator pedal being pressed and step 616 can be performed in response to the accelerator pedal being released or after a predetermined amount of time (e.g., 1 second) after the accelerator pedal is released. It should also be noted that process 500 and 600 may be combined sequentially, specific steps from each of the processes 500 and 600 may be combined to establish a separate process, among other possibilities.

It is contemplated that the system, steps or descriptions of each of FIGS. 1-6 may be used with any other embodiment or embodiments of this disclosure. One skilled in the art would appreciate that some system components, steps or descriptions of each of FIGS. 1-6 may be optional and may be omitted in some embodiments. More generally, the disclosure is meant to be exemplary and not limiting. In addition, the steps and descriptions described in relation to FIGS. 2-6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 3 could be used to perform one or more of the steps in FIGS. 5 and 6.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for performing vehicle yaw in an electric vehicle, wherein the electric vehicle comprises a normal driving mode where the electric vehicle is steered by turning steerable wheels of the electric vehicle, the method comprising:
   receiving an input to engage a vehicle yaw mode and indicate a yaw direction, wherein the yaw direction is one of left yaw and right yaw;
   determining inner wheels and outer wheels for the vehicle yaw mode based on the yaw direction; and
   providing forward torque to the outer wheels of the electric vehicle and backward torque to the inner wheels of the electric vehicle with the steerable wheels aligned parallel to a length of the electric vehicle.

2. The method of claim 1, wherein receiving the input comprises:
   receiving a first input to initiate the vehicle yaw mode via a graphical user interface on a vehicle display; and
   receiving a second input to indicate the yaw direction via the graphical user interface on the vehicle display, and wherein the forward torque is provided to the outer wheels and the backward torque is provided to the inner wheels based at least on the first input and the second input.

3. The method of claim 1, further comprising receiving a desired yaw turn angle, wherein the desired yaw turn angle is one of a 90-degree left rotation, a 90-degree right rotation, and a 180-degree rotation.

4. The method of claim 1, wherein each wheel of the inner wheels is configured with a motor configured to provide independent torque to a respective wheel and each wheel of the outer wheels of the electric vehicle is configured with a motor configured to provide independent torque to a respective wheel, the method further comprising:
   determining a target yaw rate of the electric vehicle; and
   adjusting the independent torques to cause the inner wheels and outer wheels to move in opposite directions to reach the target yaw rate.

5. The method of claim 4, wherein each of the motors comprises an electric motor.

6. The method of claim 1, further comprising:
disengaging from the vehicle yaw mode in response to determining that a vehicle yaw of the electric vehicle exceeds a desired yaw turn angle; and
engaging the normal driving mode in response to disengaging from the vehicle yaw mode.

7. The method of claim 1, wherein providing the forward torque to the outer wheels and the backward torque to the inner wheels is performed automatically in response to receiving the input to engage the vehicle yaw mode.

8. The method of claim 1, further comprising:
receiving an input of a number of full vehicle rotations via the vehicle yaw mode;
while operating in the vehicle yaw mode:
performing the number of full vehicle rotations via the vehicle yaw mode;
in response to performing the number of full vehicle rotations via the vehicle yaw mode:
disengaging from the vehicle yaw mode; and
engaging the normal driving mode.

9. The method of claim 1, further comprising:
in response to receiving the input:
determining an angle of the steerable wheels; and
in response to the angle being greater than an angle threshold, automatically turning the steerable wheels to reduce the angle before providing the forward torque to the outer wheels and the backward torque to the inner wheels.

10. The method of claim 1, wherein:
providing the forward torque to outer wheels of the electric vehicle comprises:
providing an open-loop forward torque to the outer wheels of the electric vehicle;
identifying slippage of the outer wheels; and
in response to identifying slippage of the outer wheels, providing a closed-loop forward torque to the outer wheels of the electric vehicle; and
providing the backward torque to inner wheels of the electric vehicle comprises:
providing an open-loop backward torque to the inner wheels of the electric vehicle;
identifying slippage of the inner wheels; and
in response to identifying slippage of the inner wheels, providing a closed-loop backward torque to the inner wheels of the electric vehicle.

11. A system for performing vehicle yaw in an electric vehicle wherein the electric vehicle comprises a normal driving mode where the electric vehicle is steered by turning steerable wheels of the electric vehicle, the system comprising:
control circuitry configured to:
receive an input to engage a vehicle yaw mode and indicate a yaw direction, wherein the yaw direction is one of left yaw and right yaw;
determine inner wheels and outer wheels for the vehicle yaw mode based on the yaw direction; and
provide forward torque to the outer wheels of the electric vehicle and backward torque to the inner wheels of the electric vehicle with the steerable wheels aligned parallel to a length of the electric vehicle.

12. The system of claim 11, wherein the control circuitry is further configured to receive the input by:
receiving a first input to initiate the vehicle yaw mode via a graphical user interface on a vehicle display; and
receiving a second input to indicate the yaw direction via the graphical user interface on the vehicle display, and wherein the forward torque is provided to the outer wheels and the backward torque is provided to the inner wheels based at least on the first input and the second input.

13. The system of claim 11, further configured for the control circuitry to receive a desired yaw turn angle, wherein the desired yaw turn angle is one of a 90-degree left rotation, a 90-degree right rotation, and a 180-degree rotation.

14. The system of claim 11, further comprising:
a plurality of motors, each configured to provide independent torque, wherein each wheel of the inner wheels is configured with a respective motor configured to provide independent torque to the respective wheel and each wheel of the outer wheels of the electric vehicle is configured with a respective motor configured to provide independent torque to the respective wheel, the control circuitry is further configured to:
determine a target yaw rate of the electric vehicle; and
adjust the independent torques to cause the inner wheels and outer wheels to move in opposite directions to reach the target yaw rate.

15. The system of claim 11, wherein the control circuitry is further configured to:
disengage from the vehicle yaw mode in response to determining that a vehicle yaw of the electric vehicle exceeds a desired yaw turn angle; and
engage the normal driving mode in response to disengaging from the vehicle yaw mode.

16. The system of claim 11, wherein the control circuitry is further configured to provide the forward torque to the outer wheels and the backward torque to the inner wheels automatically in response to receiving the input to engage the vehicle yaw mode.

17. The system of claim 11, wherein the control circuitry is further configured to:
receive an input of a number of full vehicle rotations via the vehicle yaw mode;
while operating in the vehicle yaw mode:
perform the number of full vehicle rotations via the vehicle yaw mode;
in response to performing the number of full vehicle rotations via the vehicle yaw mode:
disengage from the vehicle yaw mode; and
engage the normal driving mode.

18. The system of claim 11, the control circuitry is further configured to:
in response to receiving the input:
determine an angle of the steerable wheels; and
in response to the angle being greater than an angle threshold, automatically turn the steerable wheels to reduce the angle before providing the forward torque to the outer wheels and the backward torque to the inner wheels.

19. The system of claim 11, wherein the control circuitry is further configured to provide the forward torque to outer wheels of the electric vehicle by:
providing an open-loop forward torque to the outer wheels of the electric vehicle;
identifying slippage of the outer wheels; and
in response to identifying slippage of the outer wheels, providing a closed-loop forward torque to the outer wheels of the electric vehicle; and
wherein the control circuitry is further configured to provide the backward torque to inner wheels of the electric vehicle by:

providing an open-loop backward torque to the inner wheels of the electric vehicle;

identifying slippage of the inner wheels; and in response to identifying slippage of the inner wheels, providing a closed-loop backward torque to the inner wheels of the electric vehicle.

20. An electric vehicle comprising:

a plurality of wheels;

a plurality of electric motors, each comprising a motor shaft coupled to a respective one of the plurality of wheels, wherein each electric motor is configured to generate a respective torque to a respective wheel;

input interface configured to receive an input from an operator of the electric vehicle to engage a vehicle yaw mode and indicate a yaw direction, wherein the yaw direction is one of left yaw and right yaw; and control circuitry configured to:
  receive the input from the input interface;
  determine inner wheels and outer wheels for the vehicle yaw mode based on the yaw direction; and
  provide forward torque to the outer wheels of the electric vehicle and backward torque to the inner wheels of the electric vehicle with steerable wheels of the electric vehicle aligned parallel to a length of the electric vehicle.

* * * * *